R. Farr,
Pipe Coupling.
N° 47,002. Patented Mar. 28, 1865.

Witnesses:
John B. Fisk
Henry O. Osoiago

Inventor:
Ransom Farr

United States Patent Office.

RANSOM FARR, OF CHESTERFIELD, NEW HAMPSHIRE.

IMPROVEMENT IN CONNECTIONS FOR WATER-PIPES.

Specification forming part of Letters Patent No. 47,002, dated March 28, 1865.

*To all whom it may concern:*

Be it known that I, RANSOM FARR, of the town of Chesterfield, county of Cheshire, and State of New Hampshire, have invented a new and Useful Improvement in Pipes for Conveying Water and other Liquids; and I do declare the following to be a full, clear, and exact description of the same, reference being had to the accompanying drawings, and the letters of reference marked thereon.

The nature and object of my invention is to furnish a permanent, cheap, and durable way of clamping together two or more pieces to form a hollow pipe, and by the same bond to unite longitudinally or at angles the sections of pipes so formed for the conveyance of water and other fluid.

Figure 2:
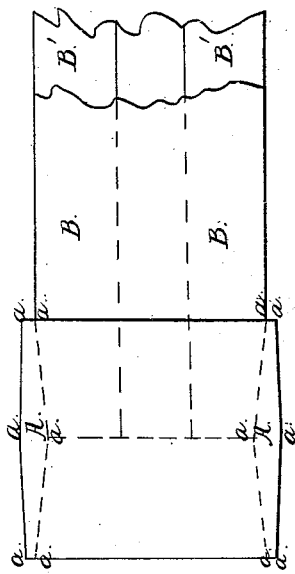
Figure 1:
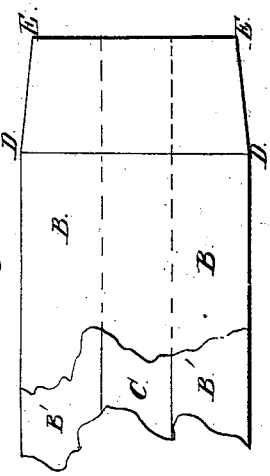
Figure 3:
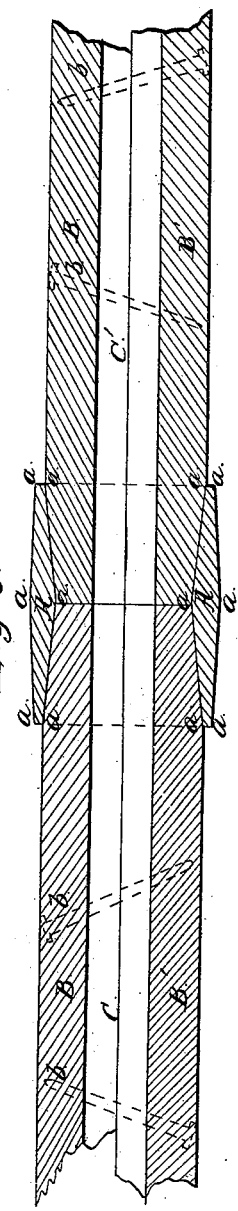
Figure 4:
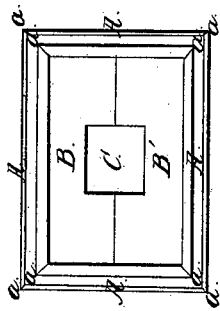

Figure 1 is a top view of one piece of the pipe. Fig. 2 is a top view of a piece of pipe and its connection. Fig. 3 is a longitudinal section of a portion of the pipe connected together. Fig. 4 is an end view of the connection with one section of the pipe inserted.

In the different figures similar letters refer to similar parts.

To enable others skilled in the art to make and use my invention, I will proceed to describe the same with reference to the drawings.

The pipe which conveys the water is made of wood, in two parts, B and B′, with an opening, C. This opening is one-half in B and one-half in B′. The pipe in the drawings is made rectangular, as also the connecting casting. This form may be varied, and made circular in its cross-section, or any desired shape. It is shown in the drawings in a rectangular shape, as this is deemed the cheapest form, as the pipe can be readily cut from plank, and the opening C can be made with ease and rapidity with the proper well-known machinery. A portion of the pipe is shown broken off in drawings in Figs. 1, 2, and 3.

These pipes may be made in sections, and of the usual length of plank, cut off square at the ends, as shown at A A, Figs. 2, 3, and 4, and, being made in two pieces, are put together by nails $b\ b\ b$, as shown in Fig. 3. A is the connection-piece, made in one piece, of cast-iron or other metal. In form it will have a cross-section corresponding with the form of the cross-section of the pipe. This connecting-piece A forms a short tube, which is beveled both inwardly and outwardly from the center to the end, as shown at $a$.

Figs. 1 and 2 represent two sections of the pipe disconnected and ready to be joined together, Fig. 1 being a portion of the wooden pipe made in two parts joined together by the nails $b\ b$, the end being beveled off, as shown at D and E, to correspond with the internal bevel of A. Fig. 2 represents the connecting-piece A, with one end of the wooden pipe B B inserted to complete the connection. The end E of the wooden pipe is inserted into the opening in the connecting-piece A, and is made to fit snugly into it. The ends of the wooden pipes, after they are joined together by nails or bolts $b\ b$, being cut off square, are driven together within the connecting-piece, so that their ends will abut against each other, as shown at $a\ a$, Fig. 3.

In putting down these pipes to convey water, the wooden parts being completed in lengths or sections and joined together with nails or otherwise, one end of the first length is beveled off and the casting A is driven onto the beveled end of the wooden pipe, as shown in Fig. 2. The next length is beveled off at each end. One end is shown at D E, Fig. 1. This end is inserted in A, and is driven snugly into it until the end E E abuts against $a\ a$, as shown at $a\ a$, Fig. 3. This operation is repeated until the whole length of pipe required is laid. Should it be necessary to depart from a straight line, the castings for the connecting-pieces may be made of a shape to suit the circumstances of the case.

Having thus fully described the nature and object of my invention, what I claim as new, and desire to secure by Letters Patent, is—

Connecting the sections of a water-pipe together with a single connecting piece or casting, laterally as well as longitudinally, substantially as described.

RANSOM FARR.

Witnesses:
JOHN B. FISK,
HENRY O. COOLIDGE.